United States Patent [19]
Gay

[11] Patent Number: 5,644,867
[45] Date of Patent: Jul. 8, 1997

[54] PLANTER BOX

[76] Inventor: G. Thomas Gay, 3275 Georgian Ct., Erie, Pa. 16506

[21] Appl. No.: 105,351

[22] Filed: Aug. 10, 1993

[51] Int. Cl.$^6$ ..................................... A01G 9/04
[52] U.S. Cl. ................................. 47/71; 47/65.6
[58] Field of Search ...................... 47/39, 71, 66, 47/67 R

[56] References Cited

U.S. PATENT DOCUMENTS

| 3,578,204 | 5/1971 | Block | 47/66 |
| 3,896,587 | 7/1975 | Insalaco | 47/66 |
| 4,315,382 | 2/1982 | Kay | 47/71 |
| 4,715,144 | 12/1987 | Lee | 47/66 |
| 5,022,183 | 6/1991 | Bohlmann | 47/71 |
| 5,269,095 | 12/1993 | Helfman | 47/66 |

FOREIGN PATENT DOCUMENTS

| 0065108 | 11/1982 | European Pat. Off. | 47/66 |
| 52 220 | 10/1910 | Switzerland | 47/66 |

Primary Examiner—Henry E. Raduazo
Attorney, Agent, or Firm—Hugh D. Jaeger

[57] ABSTRACT

A planter for attachment to an object having a base and a planter member. The base and planter having matching receptacles for joining one to the other and the base having a means to receive fasteners for attachment to another object. The planter further having sides with a top edge and lip member defining alternating sculpted surfaces for strengthening and improving the appearance of said planter.

3 Claims, 9 Drawing Sheets

PLANTER BOX

CROSS REFERENCES TO CO-PENDING APPLICATIONS

None.

BACKGROUND OF THE INVENTION

1. Field of the Invention

The present invention is for a planter box, and more particularly pertains to a planter box with a base planter box.

2. Description of the Prior Art

Molded prior art planter boxes have not been easily installed and have not always provided versatility. The prior art planter boxes were subject to tipping off a deck railing. Also prior art planter boxes were generally not cosmetically functional.

The present invention overcomes the deficiencies of the prior art by providing a cosmetically functional planter box.

SUMMARY OF THE INVENTION

The general purpose of the present invention is a planter box which is functional and has a cosmetic appearance.

According to one embodiment of the present invention, there is provided a planter box with a base. The base of the planter box can be screwed onto a deck railing or other object. The planter box that engages into the base when the alternative planter box in the base can be screwed together to an object. Both the base and the planter box include certain sculptured surfaces in fluting which provide cosmetic appearance as well as functional structure. Optional drain holes can be provided in the planter box to relieve any moisture.

The significant aspects and features of the present invention include a planter box with the base which can be used together or by themselves and which can be molded out of any suitable polymer material.

Having thus described embodiments of the present invention, it is the principal object of the present invention to provide a planter box with a base for the planting of items in dirt in the planter box.

One object the present invention provides is a planter box base which architecturally cosmetically match each other.

DETAILED DESCRIPTION OF THE PREFERRED EMBODIMENTS

Figure 1:
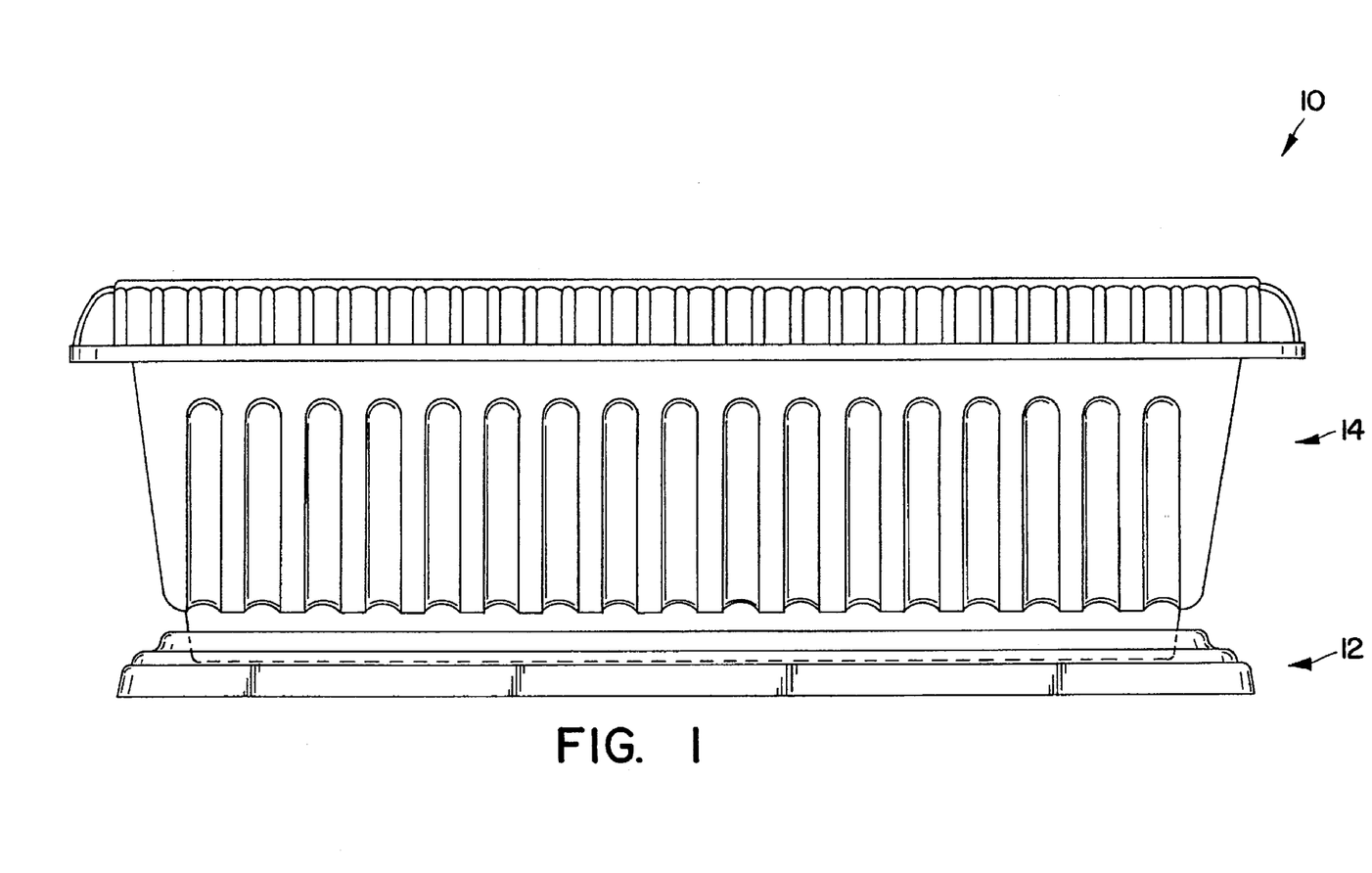
FIG. 1 illustrates a front view of the planter box and base.

FIG. 1 illustrates a secure planter box assembly 10 having a base 12 which secures to a surface and a planter box 14 which aligns and is securable within the base 12.

Figure 2:
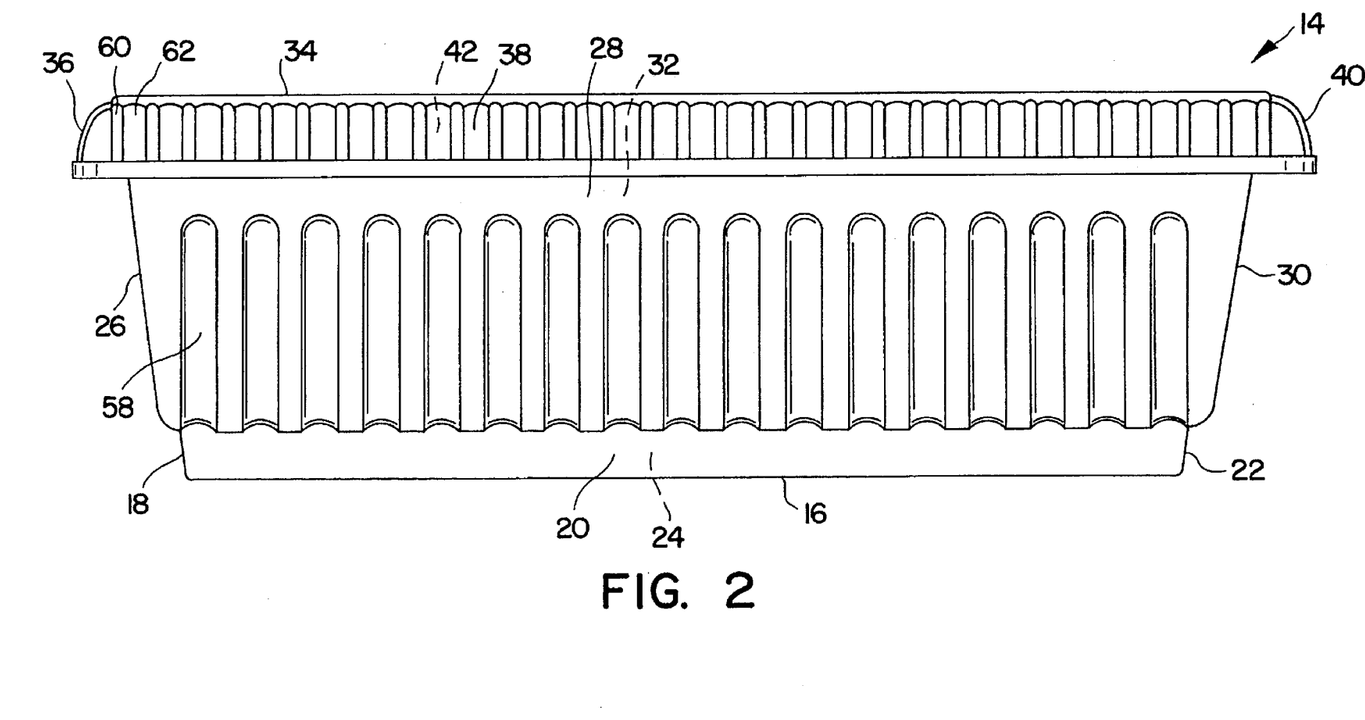
FIG. 2 illustrates a front view of the planter box.
Figure 3:
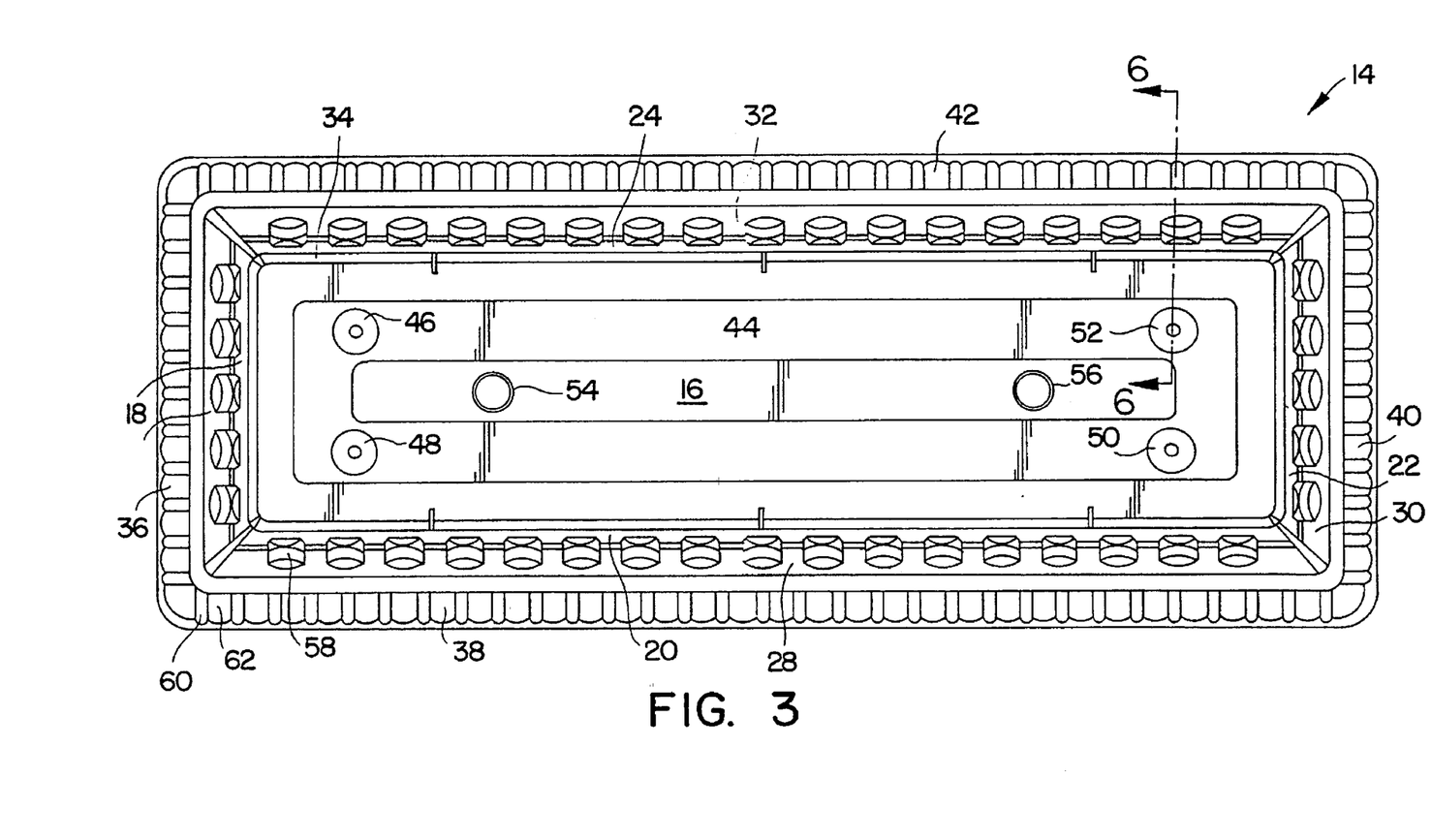
FIG. 3 illustrates a top view of the planter box.

FIGS. 2 and 3 illustrate a side view and a top view respectively of the planter box 14 where all numerals correspond to those elements previously described. The planter box 14 includes a bottom 16, lower side members 18, 20, 22 and 24 extending upwardly from the bottom 16, upper side members 26, 28, 30 and 32, a continuous top edge 34 and lip members 36, 38, 40 and 42 extending from the continuous top edge 34.

Various alignment, securation and structural reinforcement members align about, through and within the planter box 14. The bottom 16 includes a raised rectangular channel support member 44 from which cylindrical posts 46, 48, 50 and 52 extend vertically. The cylindrical posts 46–52 are incorporated to align and secure the planter box 14 with correspondingly aligned and mating cylindrical posts in the base 12 as illustrated in the FIGS. as later described. Drains 54 and 56 align centrally in the bottom 16 to allow moisture to drain from the interior of the planter box and to the base below. Sealing plugs (not illustrated) can seal the bottom 16 if drainage is not required nor desired. Upper sides 26–32 include a plurality of like and similar support flutes 58 aligned along and about to lend support to the upper sides 26–32 and also to prevent bowing and misalignment of the upper sides 26–32. The lip members 36–42 include a plurality of alternating sculptured surfaces 60 and 62 along their lengths to lend support to the upper sides 26 and 32 and top edge 34 to prevent bowing and misalignment of the upper sides 26–32 and of the lip members 36–42 as well. Additional reinforcement web members are included beneath the lip members 36–42 as illustrated in FIG. 6 to prevent bowing and misalignment of the lip members 36–42.

Figure 4:
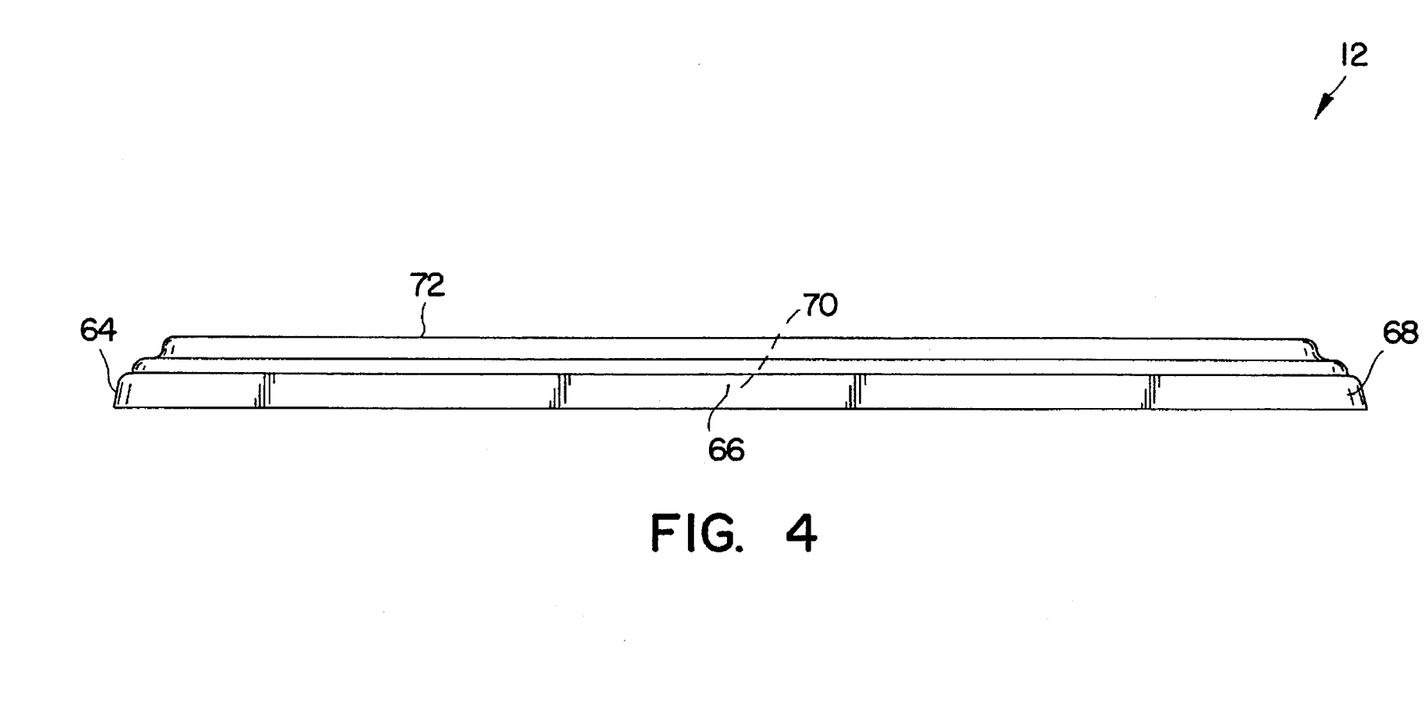
FIG. 4 illustrates a front view of the base.
Figure 5:
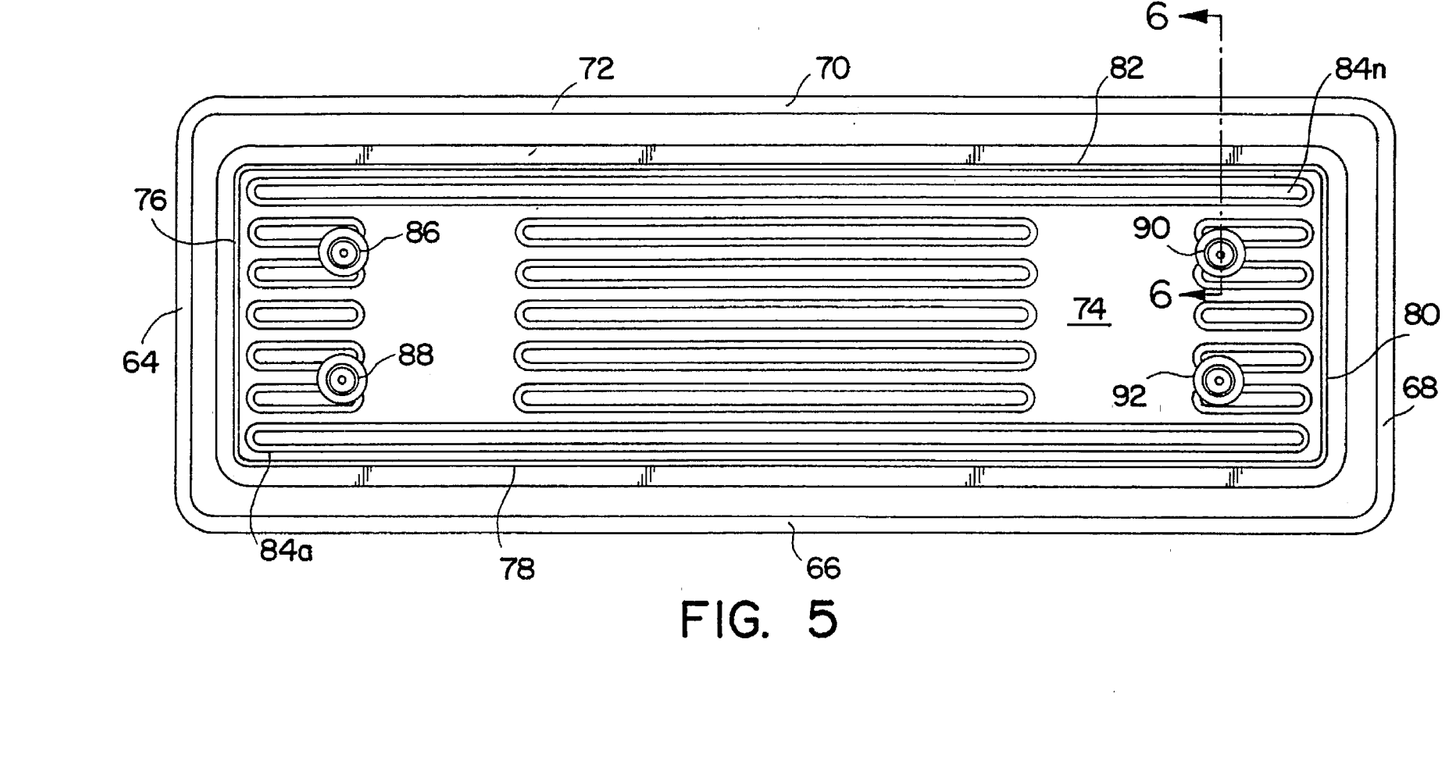
FIG. 5 illustrates a top view of the base.

FIGS. 4 and 5 illustrate a side and top view of the base 12 where all numerals correspond to those elements previously described. The base 12 includes plate and side members 64, 66, 68 and 70 descending from a continuous top edge 72, a bottom 74, inner side walls 76, 78, 80 and 82 extending between the top edge 72 and the bottom 74, a plurality of various length support flutes 84a–84n aligned and about the bottom 74 and cylindrical posts 86, 88, 90 and 92 aligned through the bottom 74.

Figure 6:
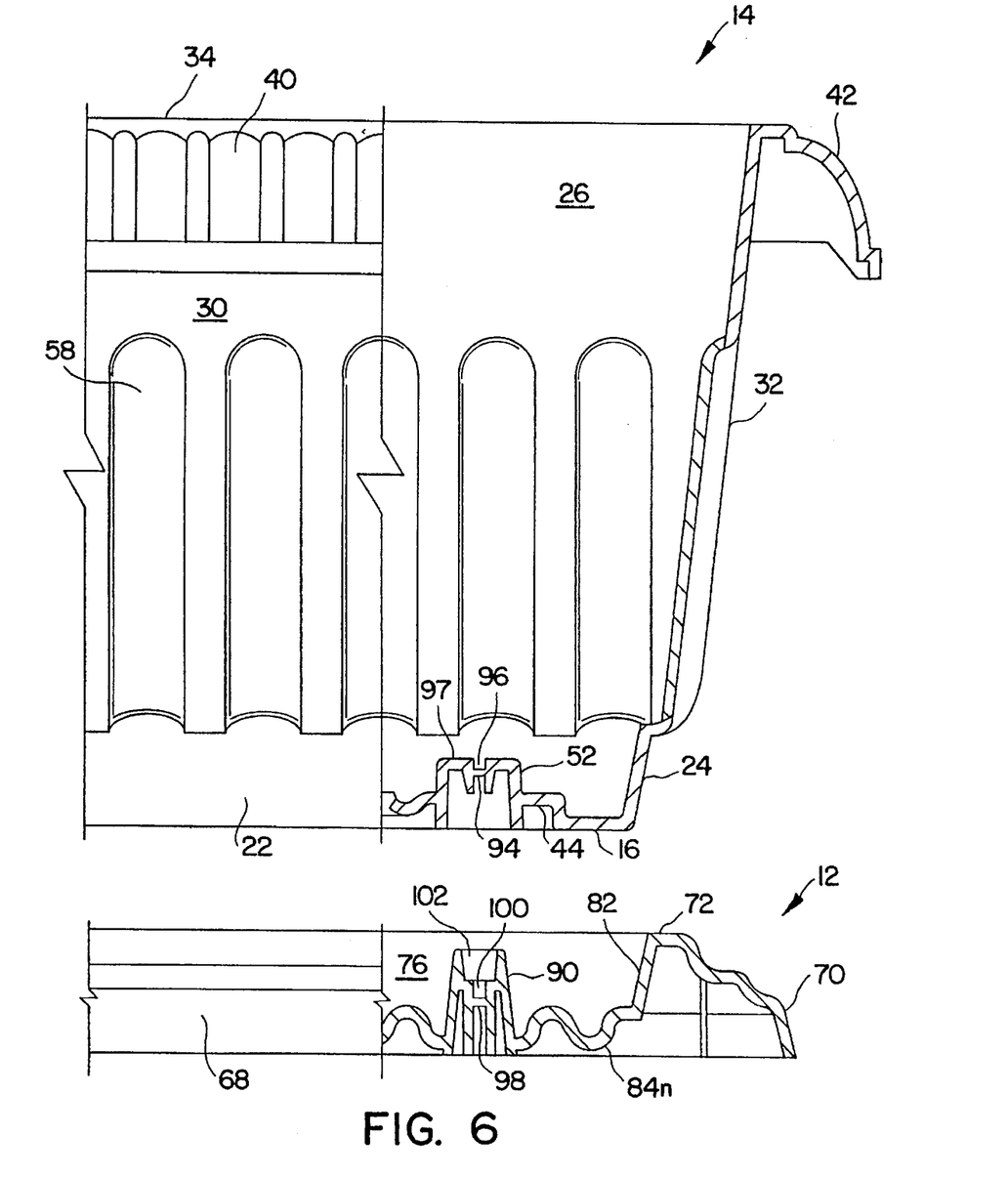
FIG. 6 illustrates a cross-section of the right end of the planter box and the base along line AA of FIG. 3 and along line BB of FIG. 5.
Figure 8:
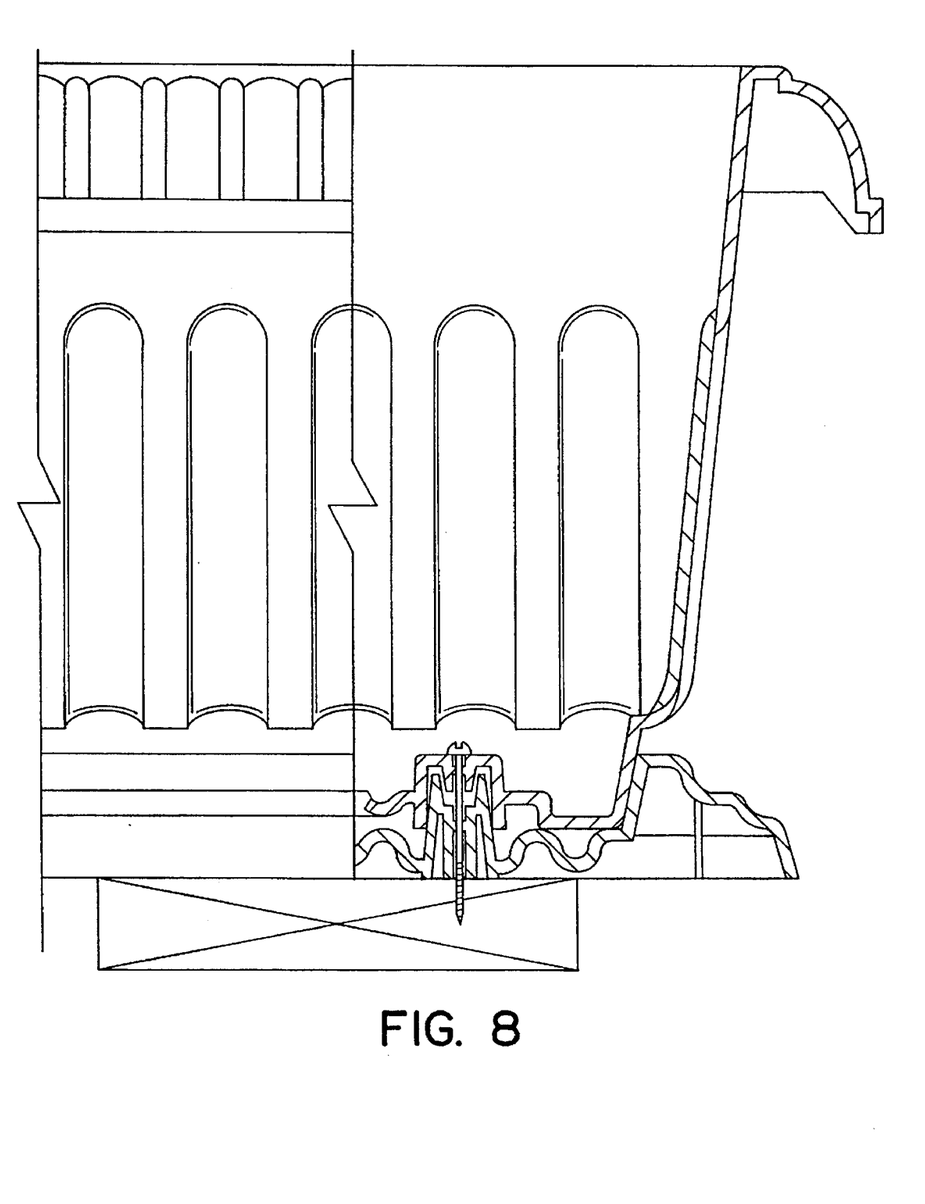
FIG. 8 illustrates a cross-sectional view along the view lines where the planter box and base are secured to a surface.

FIG. 6 illustrates a cross section of the right end of the planter box 14 and the base 16 from view lines A—A and B—B respectively of FIGS. 3 and 4 where all numerals correspond to those elements previously described. The planter box 14 and base 16 are aligned prior to mutual engagement as illustrated in the FIG. Cylindrical post 52, being similar to cylindrical posts 46, 48 and 50, includes a thin puncturable membrane 94 in the central aperture 96 in a like fashion cylindrical post 90, being similar to cylindrical posts 86, 88 and 92, includes a thin puncturable membrane 98 in the aperture 100. The upper region 97 of the cylindrical post 52 accommodates the head of a securing screw as illustrated in FIG. 8. Aperture 100 includes a cylindrical area 102 for accommodation of a screw head.

MODE OF OPERATION

Figure 7:
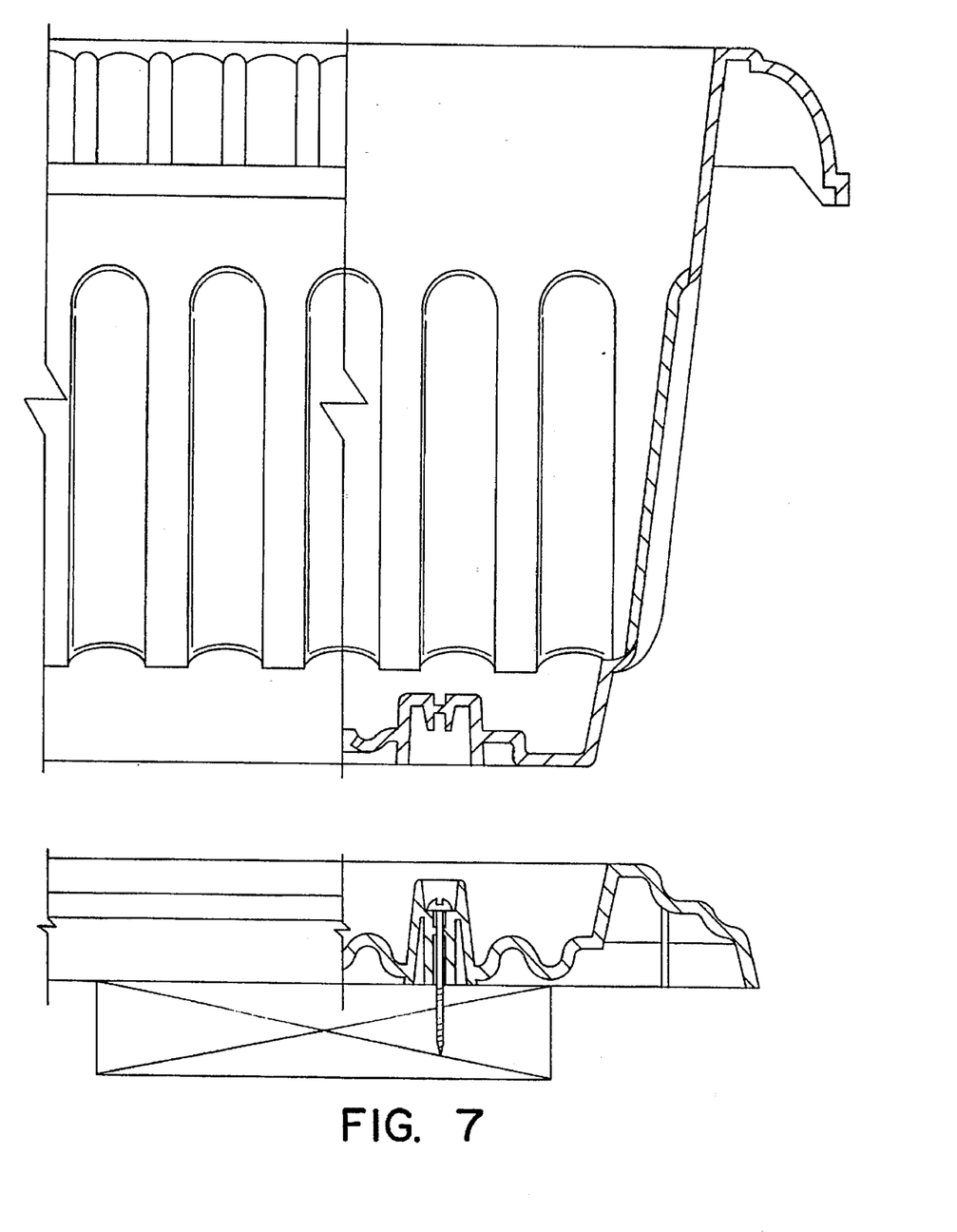
FIG. 7 illustrates a cross-sectional view along the view lines where the planter box is secured to a surface.

FIG. 7 illustrates a cross-sectional view along the view lines showing the base screwed into a member prior to engaging of the planter box into the base.

FIG. 8 illustrates a cross-sectional view along the view lines of the planter box and base secured with a screw into a member such as for example a deck railing.

Figure 9:
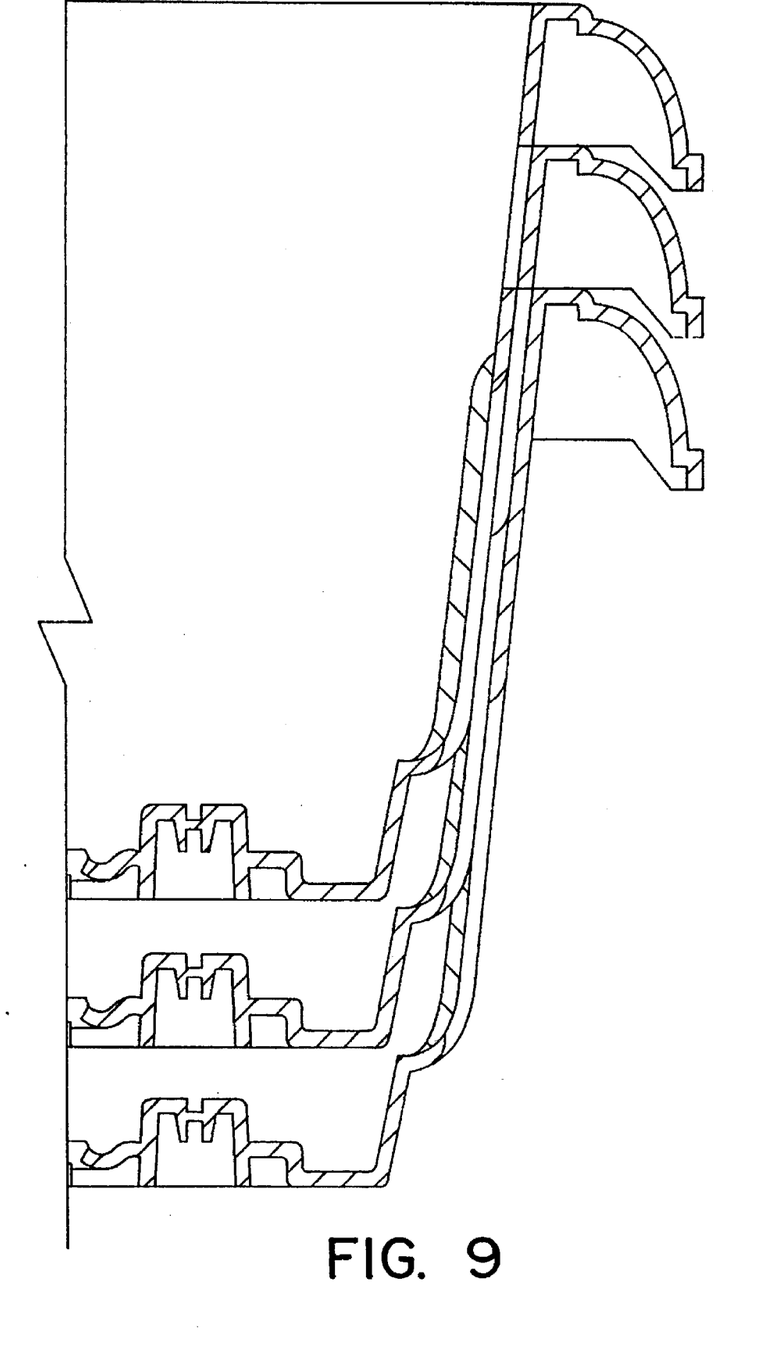
FIG. 9 illustrates stacking of the planter boxes and particularly where the webs of lip members stop one planter box from wedging tightly into another planter box when the planter boxes are stacked.

FIG. 9 illustrates planter boxes being stacked where the webs of the lip members prevent planter boxes from wedging tightly into other planter boxes when planter boxes are stacked.

Various modifications can be made to the present invention without departing from the apparent scope hereof.

I claim:

1. A planter comprising:
   a. a first base for attachment to an object, the base having a plurality of upwardly directed projections, each projection having a first geometric cross-section in a first size;
   b. a planter member for mounting on the first base, the planter member having a bottom and sides including a plurality of flutes around the sides, the bottom including a plurality of upwardly directed receptacles, matching in number the plurality of upwardly directed projections on the base, each receptacle having an inner geometric configuration and size to mate with one of the upwardly directed projections of the base; and,
   c. said sides having a top edge, a bottom edge and a lip member, said lip defining a plurality of alternating sculptured surface (60, 62) about said planter member.

2. A planter box comprising:
   a. a first base for attachment to an object, the base having a plurality of upwardly directed projections, each projection having a first geometric cross-section in a first size;
   b. a planter box member for mounting on the first base, the planter box member having a bottom and four sides including a plurality of flutes around the sides, the bottom including a plurality of upwardly directed receptacles, matching in number the plurality of upwardly directed projections on the base, each receptacle having an inner geometric configuration and size to mate with one of the upwardly directed projections of the base; and,
   c. said sides having a top edge, a bottom edge and a lip member, said lip defining a plurality of alternating sculptured surfaces (60, 62) about said planter member.

3. A planter box comprising:
   a. a first base for attachment to an object, the base having a plurality of upwardly directed projections, each projection having a first geometric cross-section in a first size;
   b. a planter box member for mounting on the first base, the planter box member having a bottom and four sides including a plurality of flutes around the sides, the bottom including a plurality of upwardly directed receptacles, matching in number the plurality of upwardly directed projections on the base, each receptacle having an inner geometric configuration and size to mate with one of the upwardly directed projections of the base; and,
   c. said sides having a top edge, a bottom edge and a lip member, said lip defining a plurality of alternating sculptured surface (60, 62) about said planter member.

* * * * *